3,542,581
METHOD OF DE-AGGREGATING OXONOL DYE-CONTAINING GELATIN LAYERS

James L. Graham and David G. France, Rochester, N.Y., assignors to Eastman Kodak Company, Rochester, N.Y., a corporation of New Jersey
Filed Nov. 5, 1968, Ser. No. 773,411
Int. Cl. G03c 1/84
U.S. Cl. 117—33.3                        1 Claim

ABSTRACT OF THE DISCLOSURE

Gelatin compositions comprising an oxonol dye are enhanced by incorporating an amphoteric surfactant to raise the extinction coefficient. The surfactant has the formula:

R—NH—(CH$_2$)$_x$—COOM or

R—N—[(CH$_2$)$_x$—COOM]$_2$ wherein R represents an alkyl radical of from 8 to 20 carbon atoms, $x=1$ or 2, and M is a member selected from the group consisting of hydrogen and cations which contribute to the water solubility of the surfactant. Addition of the surfactant causes deaggregation of the dye and a return to the molecular absorption as seen with the dye in alcohol.

BACKGROUND OF THE INVENTION

It is known that certain dyes in water or gelatin solutions do not give the same spectral absorptions as in organic solvents such as alcohols. This is due to aggregation of the dye in water or gelatin solutions and results in unwanted absorption bands and lower extinction coefficients; there is a shift of absorption wavelength and also a broader absorption range. The absorption band of the dye in alcohol is that of the molecular absorption with its wanted absorption band only.

BRIEF SUMMARY OF THE INVENTION

This invention relates to gelatin compositions including an oxonol dye. In one aspect the invention relates to gelatin compositions containing an oxonol dye of improved extinction coefficient. In another aspect, the invention relates to elements such as photographic elements, which include layers comprising gelatin and an oxonol dye. In a still further aspect, the invention relates to methods of preparing the foregoing compositions and elements.

According to this invention it has been found that certain surfactants, when added to a water or gelatin solution of oxonol dyes, cause deaggregation of these dyes and a return to the molecular absorption as seen with the dyes in alcohol. Dried gelatin film coatings of these dyes, when washed in dilute solutions of these surfactants, also showed deaggregation of the dyes. It has also been found that the deaggregated dyes resulting from a treatment with the surfactant have a much higher rate of bleaching than the untreated dyes.

DETAILED DESCRIPTION OF THE INVENTION

Figure 1A:
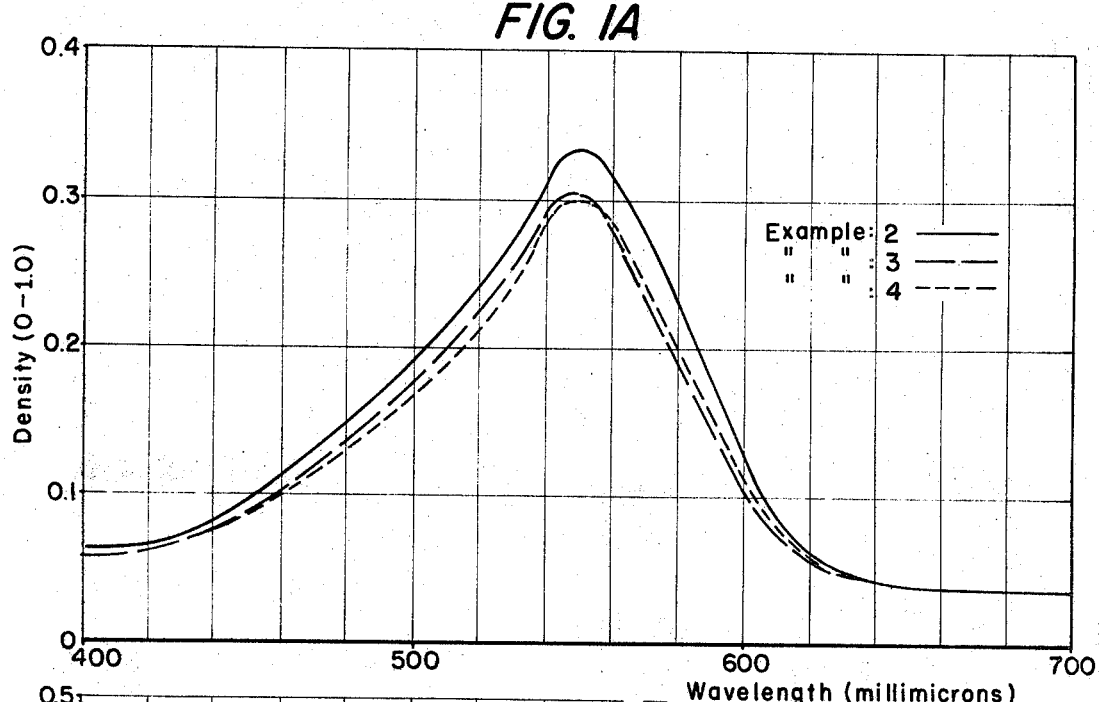
FIGS. 1A and 1B constitute a series of spectral absorption curves which show dye density as a function of the wavelength of incident light for several gelatin layers containing an oxonol dye and treated with several surface active agents.

It has been discovered that the advantages mentioned above are obtained by incorporating in a gelatin layer containing an oxonol dye, an amphoteric surfactant having the formula:

R—NH—(CH$_2$)$_x$—COOM or the formula:

R—N—[(CH$_2$)$_x$—COOM]$_2$ wherein R represents an alkyl radical of from 8 to 20 carbon atoms, $x=1$ or 2, and M is a member selected from the group consisting of hydrogen and cations which contribute to the water solubility of the surfactant. The surfactants may be prepared by reacting a primary alkyl amine having from 8 to 20 carbon atoms with chloropropionic or bromopropionic acid in the presence of an alkali such as sodium hydroxide or potassium carbonate.

The compounds can also be prepared in accordance with the method described in U.S. Pat. 2,468,012 by condensing at 25–30° C., a primary alkyl amine containing from 8 to 20 carbon atoms with methyl acrylate to form the β-alkylaminopropionate. The methyl ester is hydrolyzed to an acid or converted to the alkali or organic amine salts by the conventional method of saponification. The secondary alkyl amine is obtained by the use of molar proportions whereas the tertiary alkyl amine is obtained by using at least two molar equivalents of the acid derivatives.

In the selection of the alkyl amines, it is usually more economical to select those with an even number of hydrocarbon atoms because they are commercially available. The mixtures of amines obtained from cocoanut, or other naturally occurring oils are conveniently used. Compounds which have been found to be particularly useful include: sodium-N-dodecyl-β-aminopropionate; N-decyl-β-aminopropionic acid; potassium N-tetradecyl-β-aminopropionate; sodium-N-hexadecyl-β-aminopropionate; sodium-N-octadecyl-β-aminopropionate; monosodium salt of N-dodecyl-β-aminodipropionate; and disodium-N-octadecyl-β-aminodipropionate. Suitable cations "M" are those which contribute to the water solubility of the surfactant such as the alkali metals sodium, potassium, and lithium, ammonium, or an organic amine such as diethanolamine, trimethylamine, triethanolamine, morpholine or piperidine, etc.

The amount of surfactant that can be used according to the invention can vary widely, and in general will be the amount that will achieve a substantial amount of deaggregation and an increase in the extinction coefficient. The amount of surfactant will, in general, be from about 0.5 to 15%, by weight, based on the weight of the gelatin.

The following examples illustrate the invention.

Examples 1–7

A one-percent gelatin melt was prepared containing 0.665 percent of an oxonol magenta dye, Dye I. The pH was adjusted to 6.3 and the melt coated on cellulose acetate support to give a gelatin coverage of 60 mg./ft.$^2$ and a dye coverage of 4 mg./ft.$^2$. The coated film was then bathed for ten mnutes in 0.1 percent, pH 6.0 solutions of the various surfactants shown in Table I, dried, and a spectral absorption curve obtained on each sample. These were compared to the spectral absorption curves with no bathing (Example 2) and a solution of Dye I in methanol (Example 1). Results show that the instant amphoteric surfactant (Example 7) is unique in causing the dye to deaggregate, in that it gives a spectral absorption curve comparable to that of Dye I in methanol.

TABLE I

| Example | Surfactant | Unwanted absorption | Peak (mμ) |
|---|---|---|---|
| 1 | None (Dye I in methanol) | None | 538 |
| 2 | None | Some | 550 |
| 3 | None; bathed in water | do | 549 |
| 4 | 15.3% aqueous saponin | do | 550 |
| 5 | 13% aqueous sodium alkyl naphthalene sulfonate (Alkanol B). | do | 549 |
| 6 | 7% aqueous p-tert-octylphenoxy ethoxy ethyl sulfonate, sodium salt (Triton X-200) | do | 549 |
| 7 | 10.6% sodium salt of N-cocobeta-amino propionate (where coco represents a mixture of hydrocarbon radicals corresponding to those present in the esters in cocoanut oil) (Deriphat 151). | None | 545 |

Dye I used in the foregoing examples was bis[1,3-di-(5-carboxypentyl)-2-thiobarbituric acid (5)] trimethine oxonol.

Figure 1B:
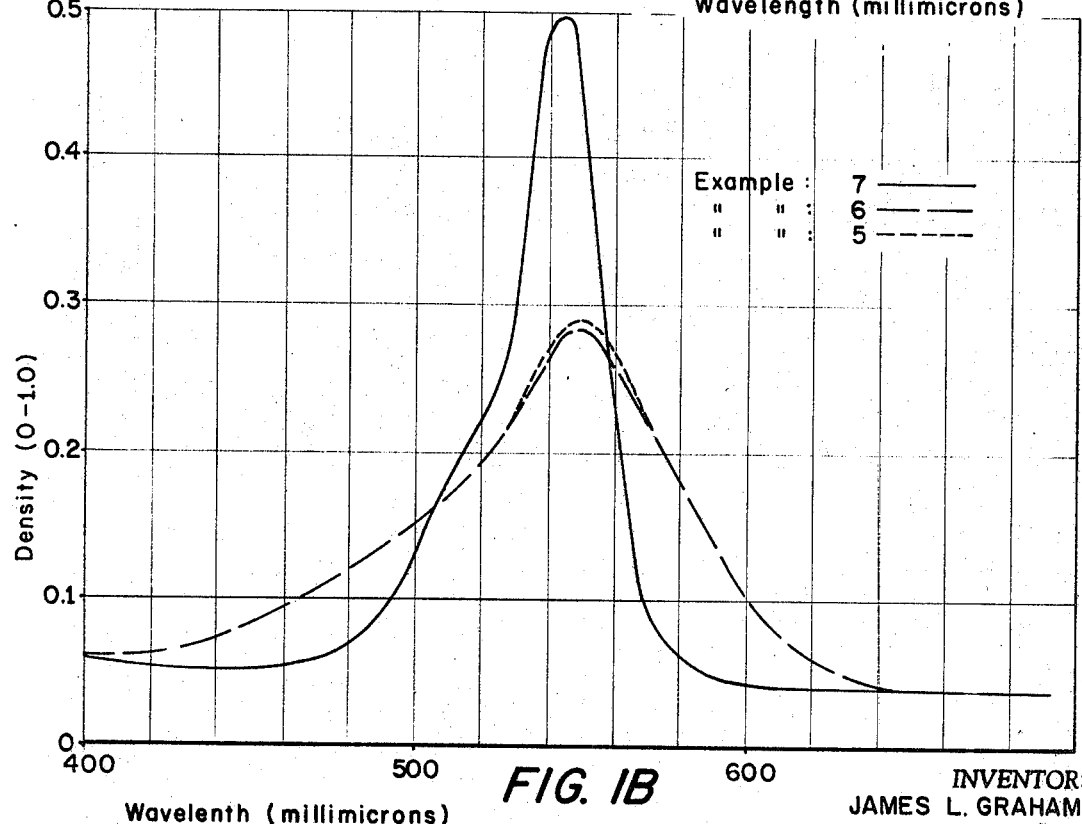

The spectral absorption curves for Examples 2–7 are shown in FIGS. 1A and 1B which show dye density (0 to 1.0) as a function of the wavelength of incident light. The density value 1.0 is equivalent to 10 percent transmission and the density value 0 is equivalent to 100 percent transmission. The spectral absorption curve of Example 7 is comparable to that of the oxonol dye in methanol.

Examples 8–17

A gelatin layer was provided as in Examples 1–7 except that it contained Dye I at 6 mg./ft.$^2$ and the layers were each bathed in the surfactant solutions containing about 5% of surfactant for 5 minutes. The results are tabulated in Table II.

TABLE II

| Example | Surfactant | Unwanted absorption | Peak (mμ) |
|---|---|---|---|
| 8 | None | Some | 550 |
| 9 | Ten minutes in water | do | 550 |
| 10 | Deriphat 151 | None | 546 |
| 11 | Antron FC-34 (complex fatty amido compound). | Some | 547 |
| 12 | Surfactant 6G (mono phenyl polyglycerol). | do | 549 |
| 13 | Surfactant 10G (mono phenyl polyglycerol). | do | 549 |
| 14 | Deriphat 150A (salt of an N-alkyl-B-amino propionate). | None | 545 |
| 15 | Deriphat 160 (disodium N-lauryl beta-aminodipropionate). | do | 546 |
| 16 | Deriphat 170B [triethanolamine salt of N-(lauryl, myristyl) beta amino propionic acid]. | do | 546 |
| 17 | Deriphat 170C [N-(lauryl, myristyl) beta amino propionic acid]. | do | 545 |

Examples 18–25

Dye I, Dye II and Dye III were used in the following gelatin melts and coated on a cellulose acetate film support. Sections of each resulting film were used to obtain spectral absorption curves to indicate the degree of deaggregation of the dye, as listed in Table III.

Example 18:
 Dye I—10 mg.
 Methanol—6 ml.
 15.3% saponin—1 ml.
 10% gelatin—10 ml.
 Water to 30 ml.

Example 19:
 Dye II—10 mg.
 Methanol—5 ml.
 15.3% saponin—1 ml.
 10% gelatin—10 ml.
 Water to 30 ml.

Example 20:
 Dye III—10 mg.
 Acetone—5 ml.
 15.3% saponin—1 ml.
 10% gelatin—10 ml.
 Water to 30 ml.

Two additional melts (Examples 21 and 22) were made like Examples 18 and 19 with 1 drop of triethanolame. Three additional melts (Examples 23, 24 and 25) were prepared like Examples 18, 19 and 20 except that in place of saponin, 5 ml. of a 2.0% Deriphate 151 solution adjusted to pH 6.0 was used. Dye II is bis[1,3-di-(5-carboxyphentyl)-2-thiobarbituric acid (5)] pentamethine oxonol. Dye III is bis[3 - (3 - nitroanilino)-1-(2,4,6-trichlorophenyl)-4-(2-pyrazolin-5 - one] pentamethine oxonol. The results, tabulated in Table III, illustrate that the effect of deaggregation can be accomplished by adding the surfactant to the coating composition prior to coating as well as after coating. The amount of surfactant to be used is that which will achieve at least a substantial amount of deaggregation of the dye and an increase in the extinction coefficient. In general, the amount of surfactant employed will be from 0.5 to 15%, by weight, based on the weight of the gelatin.

TABLE III

| Example | Feature | Unwanted absorption | Peak (mμ) |
|---|---|---|---|
| Control | Dye in methanol | None | 538 |
| 18 | Saponin in melt | Some | 553 |
| 21 | Saponin and triethanolamine in melt | do | 553 |
| 23 | Triethanolamine and Deriphat 151 in melt. | None | 545 |
| Control | Dye in methanol | None | 640 |
| 19 | Saponin in melt | Very much | 557 |
| 22 | Saponin and triethanolamine in melt | do | 547 |
| 24 | Triethanolamine and Deriphat 151 in melt. | Little | 648 |
| Control | Dye in methanol | None | 619 |
| 20 | Saponin in melt | Very much | 633 |
| 25 | Deriphat 151 in melt | None | 628 |

As mentioned above, the use of the instant surfactant also increases the rate of dye bleaching which is illustrated in the example which follows.

Example 26

The coatings of Examples 20 and 25 were subjected to a 5% aqueous sodium sulfite bleach both for equal times. Spectral absorption curves show that the film containing Deriphat 151 bleached completely while the film containing saponin bleached only slightly.

The gelatin compositions dyed with oxonol dyes to which the invention is applicable have wide utility and are particularly useful in optical filters and in photographic layers such as antihalation and filter layers. The coating compositions comprise gelatin, oxonol dye, amphoteric surfactant, and water sufficient to provide a coating by conventional techniques. The amount of dye can, of course, vary widely, and, in general, will be the amount of dye conventionally employed to achieve the desired coloration in the layer in question. For most purposes, the amount of dye will be less than 10% of the weight of gelatin and frequently less than 2% by weight. The amount of water in the composition is that conventionally used in coating compositions.

The oxonol dyes constitute a well known class of dyes of the polymethine type having an equal number of double and single bonds in the polymethine chain, with one terminal carbon atom of the chain in a heterocyclic ring attached to a carbonyl oxygen and the other terminal carbon atom of the chain in a heterocyclic ring attached to a non-carbonylic oxygen atom.

Typical oxonol dyes to which the instant invention is suitable are those oxonol dyes described in U.S. Patents 2,032,506; 2,073,759; 2,241,238; 2,621,125; 2,644,754; 2,691,581; 3,247,127; 3,364,211; 3,379,533, the disclosures of which are incorporated herein by reference.

Figure 2:
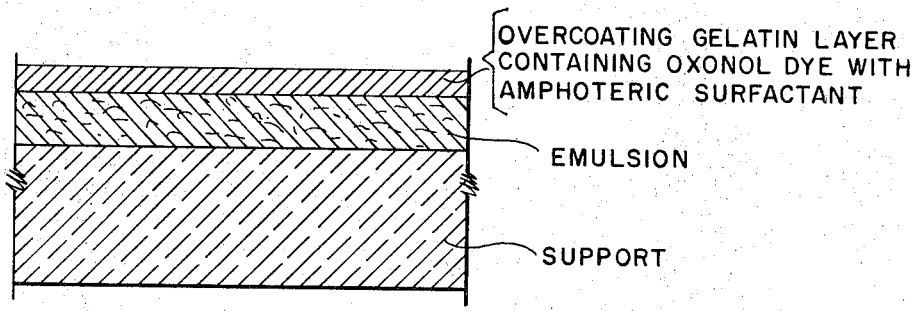
FIGS. 2-4 are cross sectional diagrammatic views of photographic elements incorporating gelatin layers containing an oxonol dye and an amphoteric surfactant according to the invention.
Figure 3:
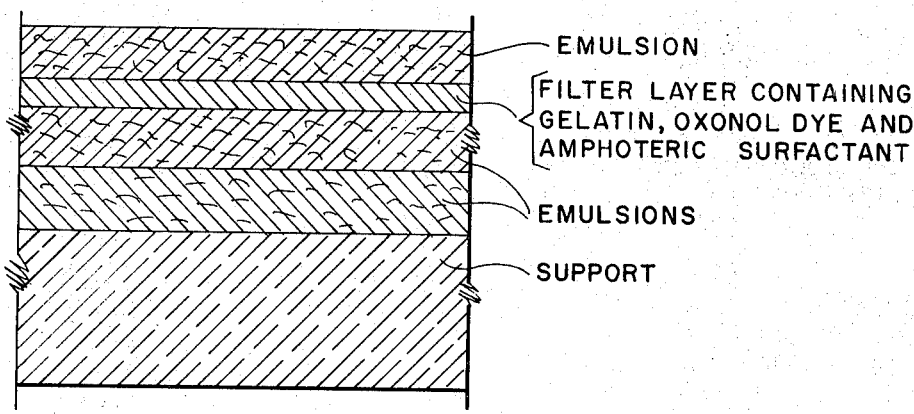
Figure 4:
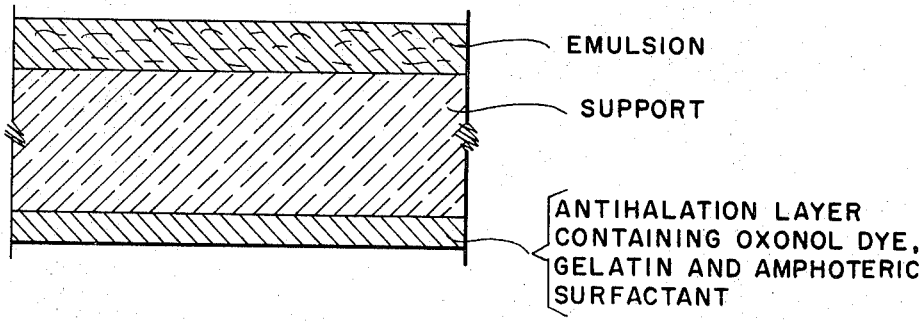

The gelatin layers are particularly suited as photographic emulsion layers containing silver halide as well as auxiliary photographic layers such as anti-halation layers underlying a gelatin silver halide layer or as filter layers either over or between gelatino-silver halide layers as shown in FIGS. 2–4. These gelatine layers may, of course, include wetting agents and other conventional additives and may also include additional binders such as polyvinyl alcohol, carboxymethyl cellulose, and the like. In general, the binder in the layer will include at least 50% by weight of gelatin.

We claim:

1. A method of providing a de-aggregated oxonol dye-containing gelatin layer comprising the steps of coating on a substrate a layer comprising gelatin and an oxonol dye, and contacting the coated layer with an aqueous solution of a surfactant selected from those having the formula:

$$R-NH-(CH_2)_x-COOM$$

and $$R-N-[(CH_2)_x-COOM]_2$$

wherein R represents an alkyl radical of from 8 to 20 carbon atoms, $x=1$ or 2, and M is a member selected from the group consisting of hydrogen and cations which contribute to the water solubility of the surfactant.

References Cited
UNITED STATES PATENTS

| | | | |
|---|---|---|---|
| 3,282,699 | 11/1966 | Jones et al. | 96—84 |
| 3,408,193 | 10/1968 | Wolf et al. | 96—84 |

RONALD H. SMITH, Primary Examiner

U.S. Cl. X.R.

96—84